Nov. 29, 1927.
R. ECKARDT
HARROW
Filed April 5, 1927
1,651,086
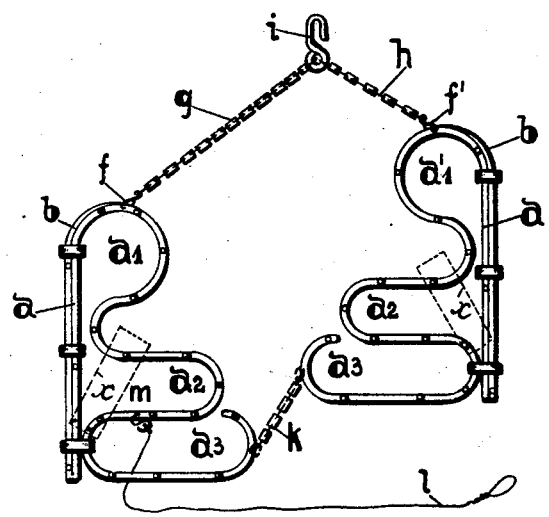
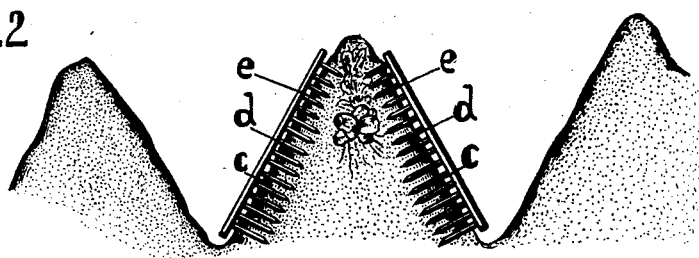
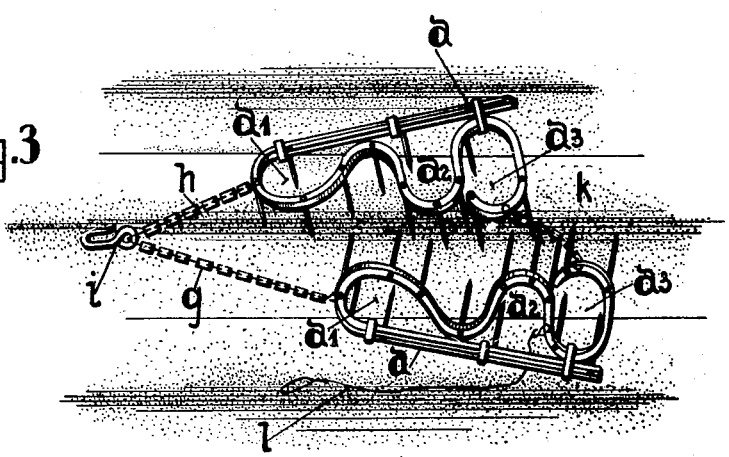

Patented Nov. 29, 1927.

1,651,086

UNITED STATES PATENT OFFICE.

RICHARD ECKARDT, OF FORSCHENGEREUTH, GERMANY.

HARROW.

Application filed April 5, 1927, Serial No. 181,086, and in Germany February 5, 1927.

This invention relates to an improved double harrow for working ridges, particularly such in potato plantations, which is illustrated on the accompanying drawing, in which Fig. 1 is a plan view of the same, Fig. 2 is a rear view thereof in its position of use, and Fig. 3 is a perspective view of the same.

Each harrow body of the double harrow comprises an integral frame of square iron consisting of a straight part $a$ and a serpentine-shaped part $a^1$, $a^2$, $a^3$ arranged laterally of said straight part, the bends $a^1$, $a^2$, $a^3$ being increased in length toward the free rear end of said straight part and the latter being strengthened by forming a double bar terminating in a tongue $b$ opposite to the free rear end of said bar. Each frame carries on its underside round-iron teeth $c$, $d$, $e$ of decreasing length, the largest teeth being located at and near the bar $a$ and the smallest at the places most remote from said bar.

The two harrow bodies thus formed are, with their bends directed toward one another, so connected at their front ends by means of a long chain $g$ and a short chain $h$ attached at $f$ and $f^1$ respectively to the smallest bends $a^1$ of said frames, e. g. to the front ends of the latter, and joined by a draught-hook $i$ thereon, and at their rear ends by means of a chain $k$ attached to the largest bends $a^3$ of said frames.

The harrow body attached to the longer chain $g$ carries a hand rope $l$ attached to the centre of gravity of said body, which point with the draught-hook $i$ and the rearmost harrow tooth of the other harrow body forms an irregular triangle. From this point, the harrow can be very easily guided and ejected from the furrow in case of need.

The operation of the improved double harrow is as follows:—

The draught-animal for the double harrow must tread in front thereof in the right-hand furrow, and the countryman walks directly beside the harrow in one of the next left-hand furrows, beside the ridge to be harrowed, the hand rope $l$ being held slightly stretched by him.

The double harrow is so applied to the ridge to be worked, that one harrow body bears upon each of the inclined planes of the ridge, the connection chain $k$ engaging then over the top of the latter and regulating the position of height of the two largest and rearmost bends $a^3$. Each bar $a$ lies then within the furrow beside the ridge to be worked and the teeth of decreasing length work thus in such a way that the shortest teeth work at the top, those of medium length at the middle, and the largest teeth at the foot, of the inclined planes of the ridge.

Thereby, the ridge is thoroughly harrowed without the seeds or plants, for instance potatoes, therein (Fig. 2) being damaged by the teeth of the harrow. This is an essential advantage over harrows of hitherto known types.

With very hard ground to be harrowed, it is recommendable to weight the harrow bodies by separate weights placed thereon, as indicated at $x$ in Fig. 1.

What I claim, is:—

A double harrow, comprising each an integral frame of square iron consisting of a strengthened straight part and a serpentine-shaped part laterally thereof having bends increasing in length toward the rear end of the harrow, round-iron teeth on the underside of said frame of a length decreasing from said bar toward the places most remote therefrom, the two frames being arranged with their serpentine-shaped parts directed toward one another, a long chain at the front end of one frame and a short chain at the front end of the other frame, a draught-hook joining said chains, another chain connecting the rear ends of said frames, and a hand rope attached to the centre of gravity of the frame connected with said long chain.

In testimony whereof I have hereunto set my hand.

RICHARD ECKARDT.